(12) United States Patent
Cho

(10) Patent No.: US 11,165,356 B2
(45) Date of Patent: Nov. 2, 2021

(54) SWITCHING POWER SUPPLY DEVICE

(71) Applicant: TDK CORPORATION, Tokyo (JP)

(72) Inventor: Hisanori Cho, Tokyo (JP)

(73) Assignee: TDK CORPORATION, Tokyo (JP)

( * ) Notice: Subject to any disclaimer, the term of this patent is extended or adjusted under 35 U.S.C. 154(b) by 8 days.

(21) Appl. No.: 16/810,537

(22) Filed: Mar. 5, 2020

(65) Prior Publication Data
US 2020/0287469 A1 Sep. 10, 2020

(30) Foreign Application Priority Data

Mar. 5, 2019 (JP) .............................. JP2019-039604

(51) Int. Cl.
*H02M 3/335* (2006.01)
*H02M 1/08* (2006.01)
(52) U.S. Cl.
CPC ......... *H02M 3/33569* (2013.01); *H02M 1/08* (2013.01)
(58) Field of Classification Search
CPC ............... H02M 3/33569; H02M 1/08; H02M 3/33523; H02M 3/33538
See application file for complete search history.

(56) References Cited

U.S. PATENT DOCUMENTS

| 6,370,047 B1 * | 4/2002 | Mallory | ................... H02M 1/10 363/65 |
| 6,751,107 B2 * | 6/2004 | Matsuda | ............... H02M 3/285 363/67 |
| 7,596,007 B2 * | 9/2009 | Phadke | .................. H02M 3/285 363/71 |
| 9,602,007 B2 * | 3/2017 | Hosoda | ............. H02M 3/33569 |

FOREIGN PATENT DOCUMENTS

| JP | 2003-289669 A | 10/2003 |
| JP | 2017-005908 A | 1/2017 |

OTHER PUBLICATIONS

Jul. 31, 2020 Extended Search Report issued in European Patent Application No. 20161247.0.

* cited by examiner

*Primary Examiner* — Kyle J Moody
(74) *Attorney, Agent, or Firm* — Oliff PLC

(57) ABSTRACT

A switching power supply device includes a pair of input terminals, a pair of output terminals, N number (N: an integer of 2 or greater) of transformers, N number of inverter circuits, a rectifying and smoothing circuit, and a driver. The transformers include respective primary-side windings and respective secondary-side windings. The inverter circuits are disposed in parallel between the pair of input terminals and the primary-side windings and each include switching elements. The rectifying and smoothing circuit is disposed between the pair of output terminals and the secondary-side windings and includes a rectifying circuit and a smoothing circuit. The driver sets an input voltage to be supplied to the smoothing circuit at successive stage levels (N+1) by causing, through switching driving, the inverter circuits to apply a predetermined pulse voltage or a voltage at a predetermined voltage value to the respective primary-side windings.

5 Claims, 11 Drawing Sheets

COMPARATIVE EXAMPLE 1
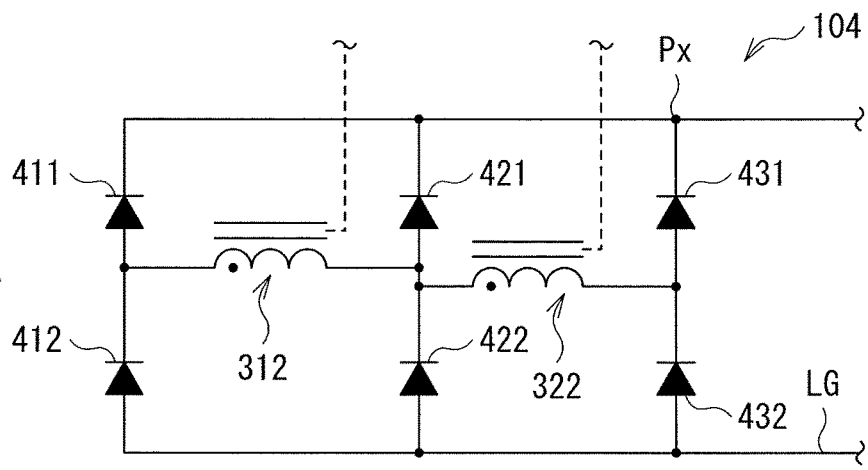
FIG. 9A
COMPARATIVE EXAMPLE 1
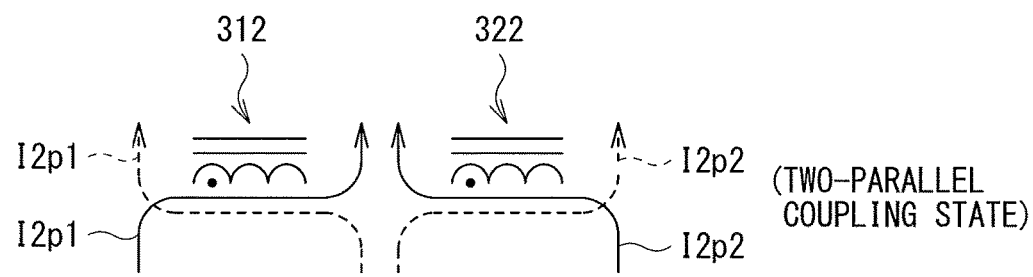
FIG. 9B (TWO-PARALLEL COUPLING STATE)
COMPARATIVE EXAMPLE 1
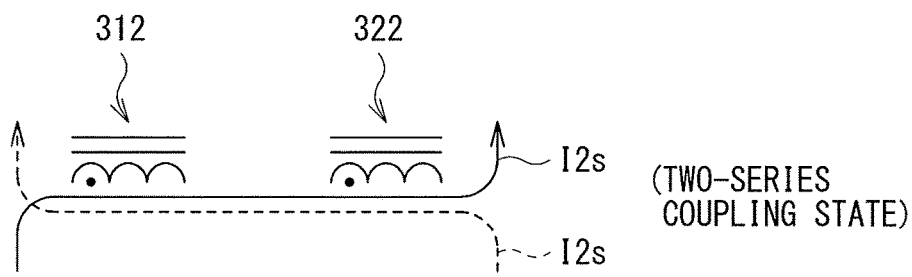
FIG. 9C (TWO-SERIES COUPLING STATE)

SWITCHING POWER SUPPLY DEVICE

CROSS REFERENCE TO RELATED APPLICATIONS

This application claims the benefit of Japanese Priority Patent Application No. 2019-039604 filed on Mar. 5, 2019, and the entire contents of which are incorporated herein by reference.

BACKGROUND

The disclosure relates to a switching power supply device that uses switching elements to convert a voltage.

A direct current-direct current (DC-DC) converter has been proposed as an example of a switching power supply device. Various kinds of DC-DC converters have been in practical use. Reference is made to Japanese Unexamined Patent Application Publication No. 2017-005908. A typical DC-DC converter includes an inverter circuit provided with switching elements, a power conversion transformer or a transformer element, and a rectifying and smoothing circuit.

SUMMARY

A switching power supply device according to one embodiment of the disclosure includes a pair of input terminals, a pair of output terminals, N number (N: an integer of 2 or greater) of transformers, N number of inverter circuits, a rectifying and smoothing circuit, and a driver. The pair of input terminals receive an input voltage. The pair of output terminals output an output voltage. The N number (N: an integer of 2 or greater) of transformers include respective primary-side windings and respective secondary-side windings. The N number of inverter circuits are disposed in parallel to each other between the pair of input terminals and the primary-side windings. The N number of inverter circuits each include switching elements. The rectifying and smoothing circuit is disposed between the pair of output terminals and the secondary-side windings. The rectifying and smoothing circuit includes a rectifying circuit and a smoothing circuit. The rectifying circuit includes a plurality of rectifying elements. The smoothing circuit includes a capacitor. The capacitor is disposed between a choke coil and the pair of output terminals. The driver performs switching driving to control operations of the respective switching elements in the N number of inverter circuits. The driver sets an input voltage to be supplied to the smoothing circuit at successive stage levels (N+1) from a 0 level to an N level by causing, through the switching driving, the N number of inverter circuits to apply a predetermined pulse voltage or a voltage at a predetermined voltage value to the respective primary-side windings of the N number of transformers.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

FIGS. 9A to 9C are circuit diagrams illustrating how an input voltage to be supplied to a smoothing circuit is set at several levels in the comparative example.

DETAILED DESCRIPTION

Figure 1:
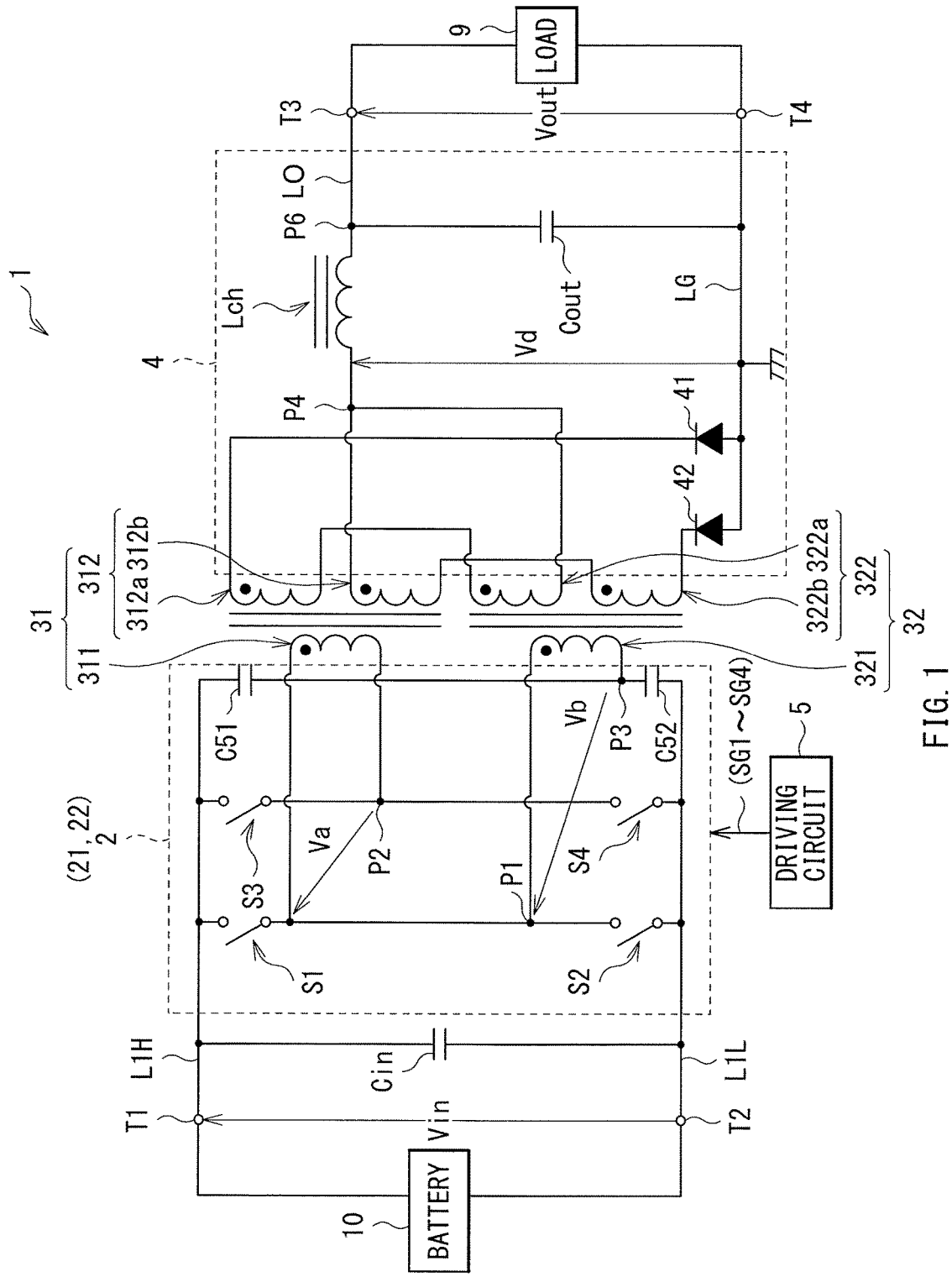
FIG. 1 is a circuit diagram illustrating an outline configuration example of a switching power supply device according to one example embodiment of the disclosure.

A DC-DC converter (a switching power supply device) disclosed in Japanese Unexamined Patent Application Publication No. 2017-005908, for example, employs a method of changing an input voltage to be supplied to a smoothing circuit in a rectifying and smoothing circuit among several levels. In other words, the DC-DC converter provides a different level voltage output.

It is desirable to provide a switching power supply device that is able to easily set a voltage to be supplied to a smoothing circuit at multiple different levels.

Some embodiments of the disclosure are described below in detail with reference to the accompanying drawings. It is to be noted that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments which are not recited in a most-generic independent claim of the technology are optional and may be provided on an as-needed basis. The drawings are schematic and are not intended to be drawn to scale. It is to be noted that the like elements are denoted with the same reference numerals, and any redundant description thereof will not be described in detail. The description is given in the following order.
1. First Example Embodiment (Example including center-tap rectifying and smoothing circuit)
2. Second Example Embodiment (Example including full-bridge rectifying and smoothing circuit)
3. Modification Example 1 (Example in which numbers of inverter circuits and transformers in second example embodiment are generalized)
4. Other Modification Examples

1. First Example Embodiment

Configuration

FIG. 1 is a circuit diagram illustrating an outline configuration example of a switching power supply device 1 according to a first example embodiment of the disclosure. The switching power supply device 1 may serve as a DC-DC converter. The DC-DC converter may voltage-convert a direct current input voltage Vin to be supplied from a battery 10 (a first battery) into a direct current output voltage Vout. The DC-DC converter may then supply the direct current output voltage Vout to a non-illustrated second battery to drive a load 9. Voltage conversion performed in the switching power supply device 1 may be up-conversion (voltage increase) or down-conversion (voltage decrease). In one example embodiment of the disclosure, the direct current input voltage Vin may correspond to a specific but non-limiting example of an "input voltage". In one example embodiment of the disclosure, the direct current output voltage Vout may correspond to a specific but non-limiting example of an "output voltage".

The switching power supply device 1 includes two input terminals T1 and T2, two output terminals T3 and T4, an input smoothing capacitor Cin, an inverter circuit 2, two transformers 31 and 32, a rectifying and smoothing circuit 4, and a driving circuit 5. The inverter circuit 2 may include two inverter circuits 21 and 22 described later. The direct current input voltage Vin may be inputted between the input terminals T1 and T2. The direct current output voltage Vout may be outputted from between the output terminals T3 and T4. In one example embodiment of the disclosure, the input terminals T1 and T2 may correspond to a specific but non-limiting example of a "pair of input terminals". In one example embodiment of the disclosure, the output terminals T3 and T4 may correspond to a specific but non-limiting example of a "pair of output terminals".

The input smoothing capacitor Cin may be disposed between a primary-side high-voltage line L1H coupled to the input terminal T1 and a primary-side low-voltage line L1L coupled to the input terminal T2. In a specific but non-limiting example, at a position between the inverter circuit 2 and the input terminals T1 and T2, a first end of the input smoothing capacitor Cin may be coupled to the primary-side high-voltage line L1H, whereas a second end of the input smoothing capacitor Cin may be coupled to the primary-side low-voltage line L1L. The input smoothing capacitor Cin may smooth the direct current input voltage Vin received from the input terminals T1 and T2. In the circuit configuration example illustrated in FIG. 1, two capacitors C51 and C52 in the inverter circuit 2 may also serve as input smoothing capacitors. The input smoothing capacitor Cin may thus be omitted.

Inverter Circuit 2

The inverter circuit 2 may be disposed between the input terminals T1 and T2 and primary-side windings 311 and 321 in the respective transformers 31 and 32 described later. The inverter circuit 2 may include four switching elements S1 to S4 and the two capacitors C51 and C52. The inverter circuit 2 may further include the inverter circuits 21 and 22. The inverter circuit 21 may include the four switching elements S1 to S4. The inverter circuit 22 may include the two switching elements S1 and S2 and the two capacitors C51 and C52. That is, the inverter circuit 21 may constitute a full-bridge circuit including the four switching elements S1 to S4, and the inverter circuit 22 may constitute a half-bridge circuit including the two switching elements S1 and S2 and the two capacitors C51 and C52. The inverter circuits 21 and 22 may be disposed in parallel to each other between the input terminals T1 and T2 and the primary-side windings 311 and 321.

In the inverter circuit 21, first ends of the switching elements S1 and S2 may be coupled to each other at a node P1. First ends of the switching elements S3 and S4 may be coupled to each other at a node P2. Second ends of the switching elements S1 and S3 may be coupled to each other on the primary-side high-voltage line L1H. Second ends of the switching elements S2 and S4 may be coupled to each other on the primary-side low-voltage line L1L. In the inverter circuit 21 configured as described above, the switching elements S1 to S4 may perform on and off operations by following respective drive signals SG1 to SG4 supplied from the driving circuit 5 described later. Such behavior as described below may thus be attained. That is, the direct current input voltage Vin applied between the input terminals T1 and T2 may be converted into an alternating current voltage (a voltage Va), which may then be outputted to the primary-side winding 311 of the transformer 31.

In the inverter circuit 22, the first ends of the switching elements S1 and S2 may be coupled to each other at the node P1. First ends of the capacitors C51 and C52 may be coupled to each other at a node P3. The second end of the switching element S1 and a second end of the capacitor C51 may be coupled to each other on the primary-side high-voltage line L1H. The second end of the switching element S2 and a second end of the capacitor C52 may be coupled to each other on the primary-side low-voltage line L1L. The primary-side winding 311 of the transformer 31 described later may be disposed between the nodes P1 and P3. In the inverter circuit 22 configured as described above, the switching elements S1 and S2 may perform the on and off operations by following the respective drive signals SG1 and SG2 supplied from the driving circuit 5. Such behavior as described below may thus be attained. That is, the direct current input voltage Vin may be converted into an alternating current voltage (a voltage Vb), which may then be outputted to the primary-side winding 321 of the transformer 32.

The switching elements S1 to S4 may be switch elements, such as metal oxide semiconductor-field effect transistors (MOS-FETs) or insulated gate bipolar transistors (IGBTs). In a case where the switching elements S1 to S4 are MOS-FETs, capacitors and diodes (not illustrated) coupled in parallel to the switching elements S1 to S4 may be parasitic capacitors and parasitic diodes of the MOS-FETs. Alternatively, these capacitors may be junction capacitors of diodes. Such a configuration eliminates the need for additional capacitors and diodes separate from the switching elements S1 to S4. This makes it possible to simplify circuit configurations of the inverter circuits 21 and 22.

Transformers 31 and 32

The transformer 31 may include the primary-side winding 311 and a secondary-side winding 312. The secondary-side winding 312 may include two secondary-side windings 312a and 312b. The primary-side winding 311 may have a first end coupled to the node P1 and a second end coupled to the node P2. The secondary-side winding 312a may have a first end coupled to a first end of a secondary-side winding 322a described later in the transformer 32, and a second end coupled to a cathode of a rectifying diode 41 described later in the rectifying and smoothing circuit 4. The secondary-side winding 312b may have a first end coupled to a first end of a secondary-side winding 322b described later in the transformer 32, and a second end coupled to a node P4 described later in the rectifying and smoothing circuit 4. The transformer 31 may voltage-convert an alternating current voltage generated by the inverter circuit 21 (i.e., the voltage Va to be sent to the primary-side winding 311 of the transformer 31). The transformer 31 may then output the alternating current voltage from the ends of the secondary-side winding 312 (312a and 312b). A degree of the voltage conversion at this time may be determined on the basis of a winding ratio between the primary-side winding 311 and the secondary-side winding 312 (312a and 312b).

The transformer 32 may include the primary-side winding 321 and a secondary-side winding 322. The secondary-side winding 322 may include the two secondary-side windings 322a and 322b. The primary-side winding 321 may have a first end coupled to the node P1, and a second end coupled to the node P3. The secondary-side winding 322a may have the first end coupled to the first end of the secondary-side winding 312a, and a second end coupled to the node P4 in the rectifying and smoothing circuit 4. The secondary-side winding 322b may have the first end coupled to the first end of the secondary-side winding 312b, and a second end coupled to a cathode of a rectifying diode 42 described later in the rectifying and smoothing circuit 4. The transformer 32 may voltage-convert an alternating current voltage generated by the inverter circuit 22 (i.e., the voltage Vb to be sent to the primary-side winding 321 of the transformer 32). The transformer 32 may then output the alternating current voltage from the ends of the secondary-side winding 322 (322a and 322b). A degree of the voltage conversion at this time may as well be determined on the basis of a winding ratio between the primary-side winding 321 and the secondary-side winding 322 (322a and 322b).

In one example embodiment of the disclosure, the transformer 31 may correspond to a specific but non-limiting example of "one transformer". In one example embodiment of the disclosure, the transformer 32 may correspond to a specific but non-limiting example of "another transformer". In one example embodiment of the disclosure, the primary-side winding 311 may correspond to a specific but non-limiting example of a "first primary-side winding". In one example embodiment of the disclosure, the primary-side winding 321 may correspond to a specific but non-limiting example of a "second primary-side winding".

Rectifying and Smoothing Circuit 4

The rectifying and smoothing circuit 4 may be disposed between the secondary-side windings 312 and 322 in the respective transformers 31 and 32 and the output terminals T3 and T4. The rectifying and smoothing circuit 4 may include the two rectifying diodes 41 and 42, one choke coil Lch, and one output smoothing capacitor Cout. The rectifying and smoothing circuit 4 may thus constitute a "center-tap" rectifying and smoothing circuit. In one example embodiment of the disclosure, the rectifying diodes 41 and 42 may correspond to specific but non-limiting examples of "rectifying elements". In one example embodiment of the disclosure, the output smoothing capacitor Cout may correspond to a specific but non-limiting example of a "capacitor".

In the rectifying and smoothing circuit 4, the node P4 of the second ends of the secondary-side windings 312b and 322a may be coupled, via the choke coil Lch, to a node P6 on an output line LO. The output line LO may be coupled to the output terminal T3. The output terminal T4 may be coupled to a ground line LG. The output smoothing capacitor Cout may be coupled between the output line LO and the ground line LG (between the output terminals T3 and T4).

In the rectifying and smoothing circuit 4, anodes of the rectifying diodes 41 and 42 may be grounded. The cathode of the rectifying diode 41 may be coupled to the second end of the secondary-side winding 312a. The cathode of the rectifying diode 42 may be coupled to the second end of the secondary-side winding 322b.

The rectifying and smoothing circuit 4 configured as described above may rectify an alternating current voltage outputted from each of the transformers 31 and 32 in a rectifying circuit including the rectifying diodes 41 and 42. The rectifying and smoothing circuit 4 may then output the rectified alternating current voltage. The rectifying and smoothing circuit 4 may smooth the voltage rectified by the rectifying circuit in a smoothing circuit including the choke coil Lch and the output smoothing capacitor Cout to generate the direct current output voltage Vout. The direct current output voltage Vout generated as described above may be outputted through the output terminals T3 and T4 to the non-illustrated second battery for charging.

Driving Circuit 5

The driving circuit 5 performs switching driving that controls operations of the respective switching elements S1 to S4 in the inverter circuits 21 and 22. In a specific but non-limiting example, the driving circuit 5 may supply the drive signals SG1 to SG4 to the respective switching elements S1 to S4 to control the on and off operations of the switching elements S1 to S4.

The driving circuit 5 may perform the switching driving to cause the two inverter circuits 21 and 22 to operate with a phase difference, for example. In other words, the driving circuit 5 may perform switching phase control for the switching elements S1 to S4, for example, to appropriately set the phase difference. It is thus possible to stabilize the direct current output voltage Vout. The driving circuit 5 may otherwise perform pulse width modulation (PWM) control for the two inverter circuits 21 and 22 (and the four switching elements S1 to S4).

Through the switching driving performed by the driving circuit 5, an input voltage to be supplied to the smoothing circuit in the rectifying and smoothing circuit 4 in the switching power supply device 1 (hereinafter referred to as a voltage Vd) is allowed to be set at multiple stage levels (i.e., multiple-level output is achieved). In a specific but non-limiting example, as will be described later in detail, the driving circuit 5 performs the switching driving to cause the two inverter circuits 21 and 22 to apply a predetermined pulse voltage or a voltage at a predetermined voltage value, described later, to the respective primary-side windings 311 and 321 in the respective transformers 31 and 32. The voltage Vd may thus be set at three successive stage levels from a 0 level (a voltage V0 described later) to a second level (a voltage V2 described later), as will be described later in detail.

In one example embodiment of the disclosure, the driving circuit 5 may correspond to a specific but non-limiting example of a "driver".

Operations, Workings, and Effects

A. Basic Operation

The switching power supply device 1 may generate an alternating current voltage (the voltage Va and/or the voltage Vb) by switching the direct current input voltage Vin supplied from the input terminals T1 and T2 in the inverter circuit 2 (21 and 22). The alternating current voltage may be supplied to each of the primary-side windings 311 and 321 in the respective transformers 31 and 32. The transformers 31 and 32 may each transform the alternating current voltage and output the transformed alternating current voltage from the respective secondary-side windings 312 and 322.

The alternating current voltage (the transformed alternating current voltage) outputted from each of the transformers 31 and 32 may be rectified by the rectifying diodes 41 and 42 in the rectifying and smoothing circuit 4 and then smoothed by the choke coil Lch and the output smoothing capacitor Cout. The direct current output voltage Vout may therefore be outputted from the output terminals T3 and T4. The direct current output voltage Vout may then be supplied to the non-illustrated second battery for charging and for driving the load 9.

B. Detailed Operation

Figure 2:
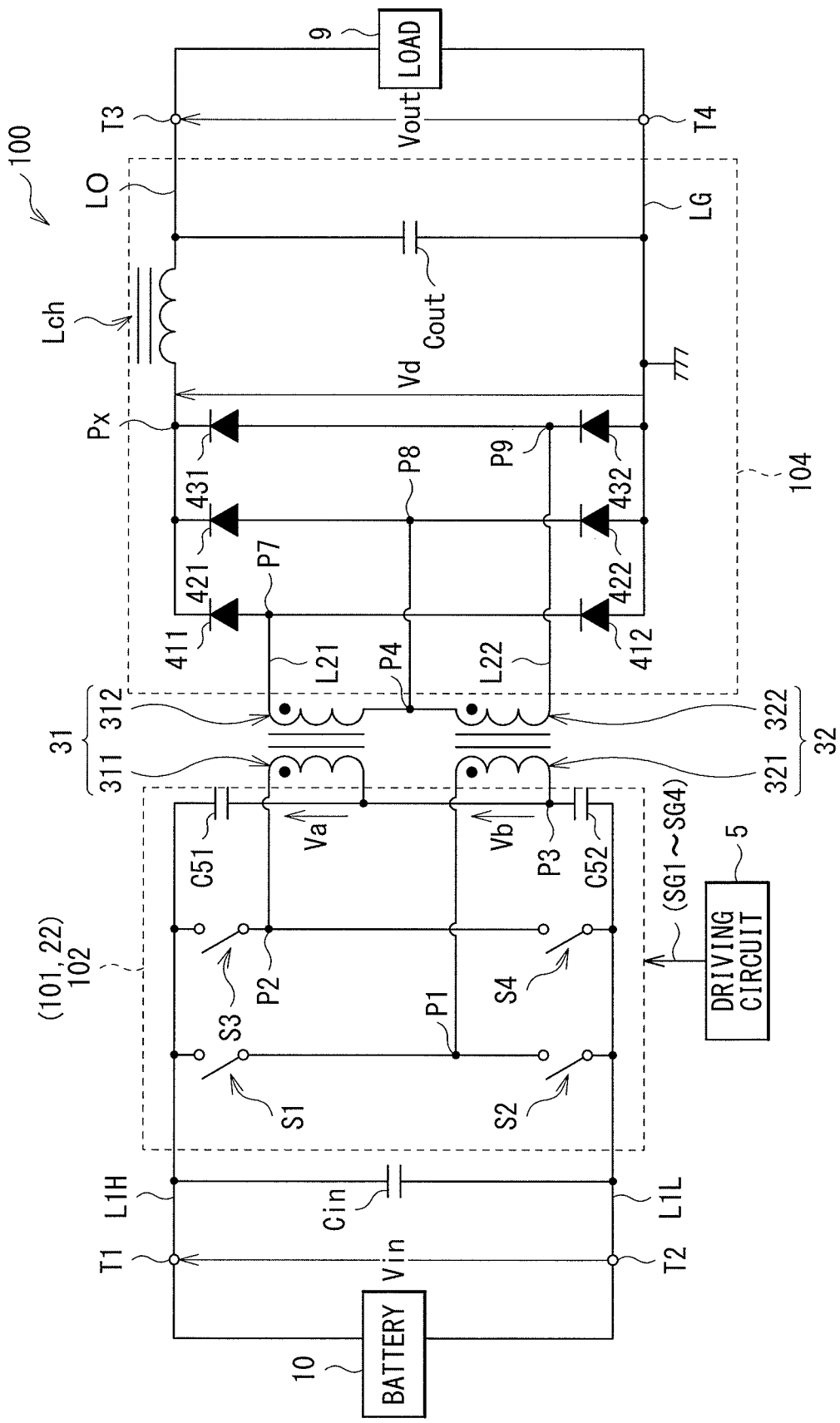
FIG. 2 is a circuit diagram illustrating an outline configuration example of a switching power supply device according to a comparative example.
Figure 3:
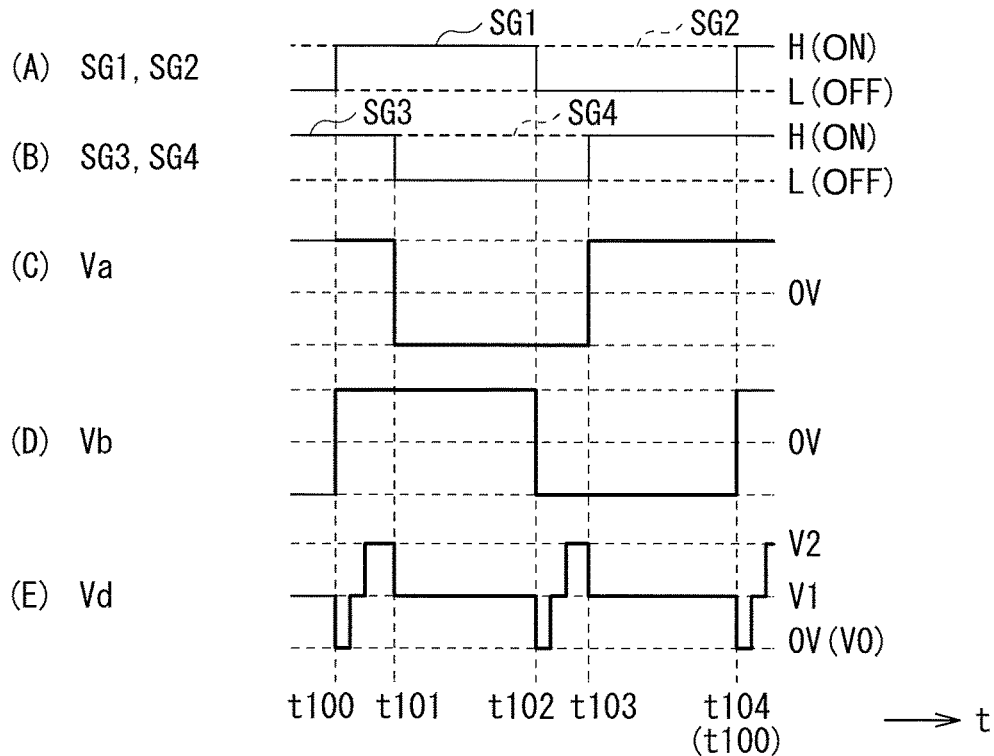
FIG. 3 is a timing waveform diagram illustrating an operation example of the switching power supply device illustrated in FIG. 2.

Next, a description will be given herein of detailed operation of the switching power supply device 1, with reference to FIGS. 2 to 9, in addition to FIG. 1, as well as with reference to a comparison with a comparative example 1 (FIGS. 2, 3, and 9).

B-1. Configuration of Comparative Example 1

FIG. 2 is a circuit diagram illustrating an outline configuration example of a switching power supply device (a switching power supply device 100) according to the comparative example 1. The switching power supply device 100 according to the comparative example 1 is different from the switching power supply device 1 according to the example embodiment illustrated in FIG. 1 in being provided with an inverter circuit 102 and a rectifying and smoothing circuit 104 instead of the inverter circuit 2 and the rectifying and smoothing circuit 4. Other components in the switching power supply device 100 are substantially the same as those in the switching power supply device 1.

The inverter circuit 2 may include the two inverter circuits 21 and 22, as described above. The inverter circuit 102 may however include two inverter circuits, i.e., the inverter circuit 22 and an inverter circuit 101. That is, the inverter circuit 102 includes the inverter circuit 101 in place of the inverter circuit 21 included in the inverter circuit 2. The inverter circuit 21 illustrated in FIG. 1 may have the circuit configuration in which the primary-side winding 311 is disposed between the nodes P1 and P2, as described above. The inverter circuit 101 illustrated in FIG. 2, however, has a circuit configuration in which the primary-side winding 311 is disposed between the nodes P2 and P3. The inverter circuit 101 thus constitutes a half-bridge circuit including the two switching elements S3 and S4 and the two capacitors C51 and C52.

Unlike the center-tap rectifying and smoothing circuit 4 described above, the rectifying and smoothing circuit 104 includes a plurality of (in this example, three) arms described below. The rectifying and smoothing circuit 104 includes six rectifying diodes 411, 412, 421, 422, 431, and 432, the one choke coil Lch, and the one output smoothing capacitor Cout.

The three arms of the rectifying and smoothing circuit 104 each include pairs of the rectifying diodes oriented in a single direction and coupled in series to each other. For example, the rectifying diodes 411 and 412 may form a first arm, the rectifying diodes 421 and 422 may form a second arm, and the rectifying diodes 431 and 432 may form a third arm. The first to third arms may be disposed in parallel to each other between the output terminals T3 and T4. For example, a node Px of first ends of the first to third arms is coupled to the output terminal T3 via the choke coil Lch and the output line LO. A node of second ends of the first to third arms is coupled to the ground line LG extending from the output terminal T4.

Cathodes of the rectifying diodes 411 and 412 of the first arm are oriented toward the first end of the first arm. Anodes of the rectifying diodes 411 and 412 of the first arm are oriented toward the second end of the first arm. For example, the cathode of the rectifying diode 411 is coupled to the node Px, the anode of the rectifying diode 411 and the cathode of the rectifying diode 412 are coupled to each other at a node P7, and the anode of the rectifying diode 412 is coupled to the ground line LG.

Likewise, cathodes of the rectifying diodes 421 and 422 of the second arm are oriented toward the first end of the second arm. Anodes of the rectifying diodes 421 and 422 of the second arm are oriented toward the second end of the second arm. For example, the cathode of the rectifying diode 421 is coupled to the node Px, the anode of the rectifying diode 421 and the cathode of the rectifying diode 422 are coupled to each other at a node P8, and the anode of the rectifying diode 422 is coupled to the ground line LG.

Likewise, cathodes of the rectifying diodes 431 and 432 of the third arm are oriented toward the first end of the third arm. Anodes of the rectifying diodes 431 and 432 of the third arm may be oriented toward the second end of the third arm. For example, the cathode of the rectifying diode 431 is coupled to the node Px, the anode of the rectifying diode 431 and the cathode of the rectifying diode 432 are coupled to each other at a node P9, and the anode of the rectifying diode 432 is coupled to the ground line LG.

The secondary-side windings 312 and 322 in the respective transformers 31 and 32 are separately H-bridge coupled between respective two adjacent arms among the first to third arms. For example, the secondary-side winding 312 of the transformer 31 is H-bridge coupled between the first arm and the second arm adjacent to each other, and the secondary-side winding 322 of the transformer 32 is H-bridge coupled between the second arm and the third arm adjacent to each other. In other words, the secondary-side winding 312 is disposed between the node P7 on the first arm and the node P8 on the second arm, and the secondary-side winding 322 is disposed between the node P8 on the second arm and the node P9 on the third arm.

The choke coil Lch is disposed between the first to third arms and the output smoothing capacitor Cout. For example, the choke coil Lch is disposed between the node Px of the first ends of the first to third arms and a first end of the output smoothing capacitor Cout, via the output line LO. The node of the second ends of the first to third arms is coupled to a second end of the output smoothing capacitor Cout on the ground line LG.

The rectifying and smoothing circuit 104 configured as described above rectifies an alternating current voltage outputted from each of the transformers 31 and 32 in the rectifying circuit including the rectifying diodes 411, 412, 421, 422, 431, and 432. The rectifying and smoothing circuit 104 then outputs the rectified alternating current voltage. The rectifying and smoothing circuit 104 smooths the voltage rectified by the rectifying circuit in the smoothing circuit including the choke coil Lch and the output smoothing capacitor Cout to generate the direct current output voltage Vout.

Figure 4:
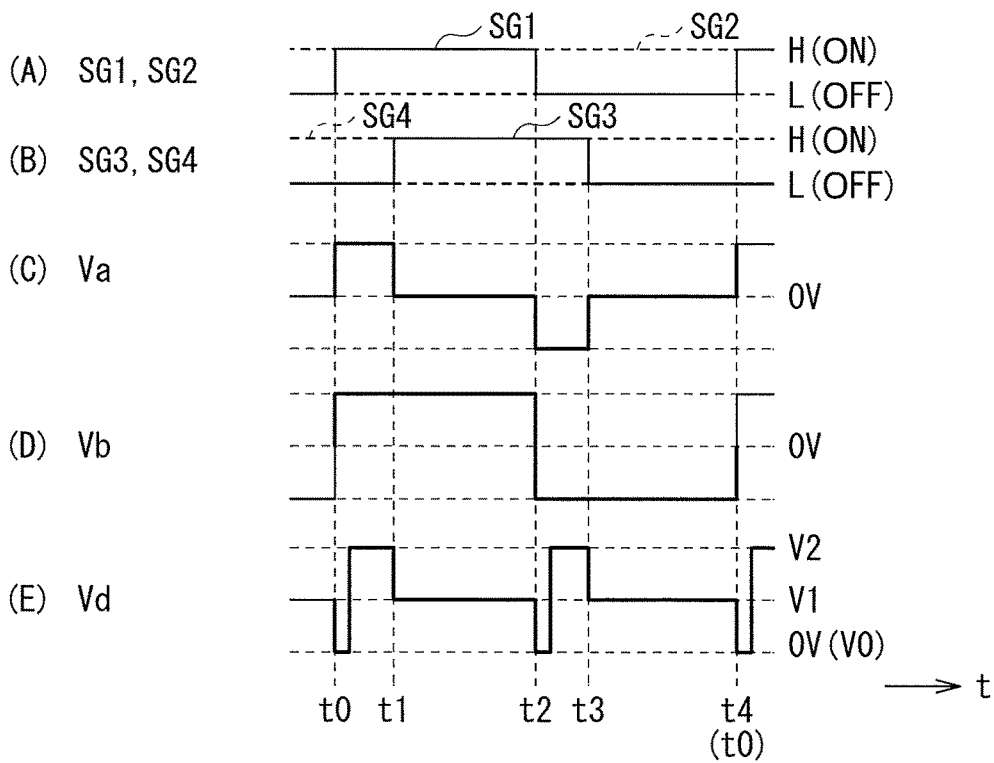
FIG. 4 is a timing waveform diagram illustrating an operation example of the switching power supply device illustrated in FIG. 1.

FIG. 3 is a timing waveform diagram illustrating voltage waveforms at respective points in the switching power supply device 100 according to the comparative example 1, and FIG. 4 is a timing waveform diagram illustrating voltage waveforms at respective points in the switching power supply device 1 according to the example embodiment described above. FIGS. 3 and 4 illustrate examples of the voltage waveforms in a case where the switching phase control, out of the switching phase control and the PMW control described above, is performed on the switching elements S1 to S4.

In FIGS. 3 and 4, Part (A) illustrates voltage waveforms of the drive signals SG1 and SG2, and Part (B) illustrates voltage waveforms of the drive signals SG3 and SG4. During a period where each of the drive signals SG1 to SG2 indicates a high (H) state, each of the switching elements S1 to S4 may be in an on (ON) state. During a period where each of the drive signals SG1 to SG2 indicates a low (L) state, each of the switching elements S1 to S4 may be in an off (OFF) state. The same applies to the other drive signals. In FIGS. 3 and 4, Part (C) illustrates a voltage waveform of an alternating current voltage (the voltage Va) to be applied to the primary-side winding 311. In FIGS. 3 and 4, Part (D) illustrates a voltage waveform of an alternating current voltage (the voltage Vb) to be applied to the primary-side winding 321. In FIGS. 3 and 4, Part (E) illustrates the voltage Vd (see FIGS. 1 and 2) at a point in front of the choke coil Lch. In FIGS. 3 and 4, a lateral axis represents a time t. As for a direction of voltage, a direction illustrated with an arrow in FIGS. 1 and 2 is specified as a normal direction.

Figure 5:
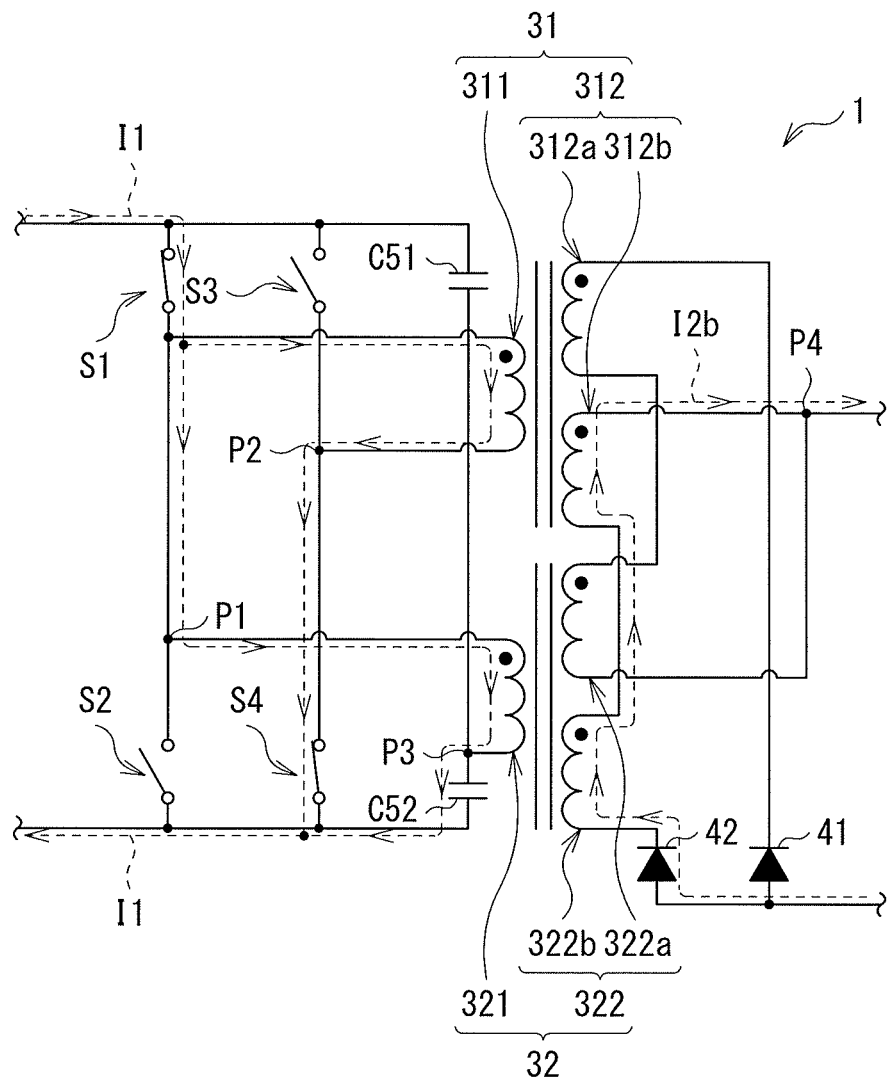
FIG. 5 is a circuit diagram illustrating an example of an operation state of the switching power supply device illustrated in FIG. 1.
Figure 6:
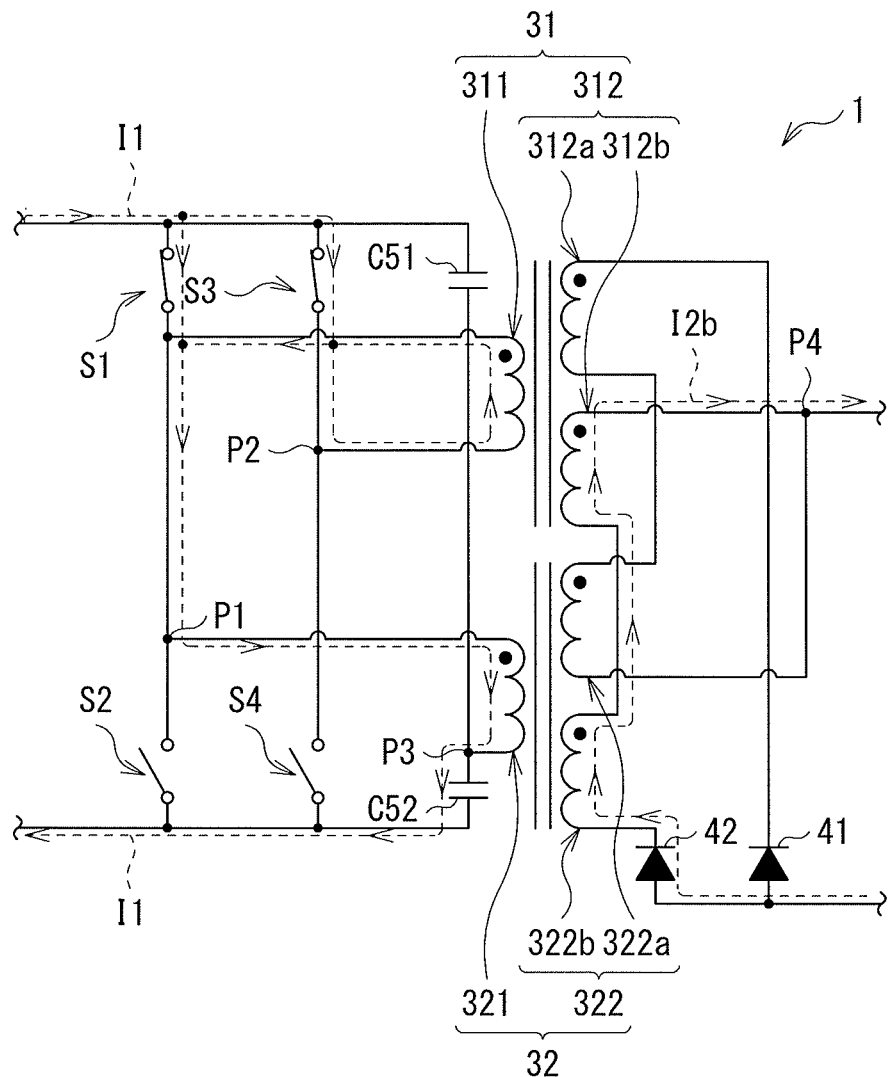
FIG. 6 is a circuit diagram illustrating the example of the operation state, continuously from FIG. 5, of the switching power supply device illustrated in FIG. 1.
Figure 7:
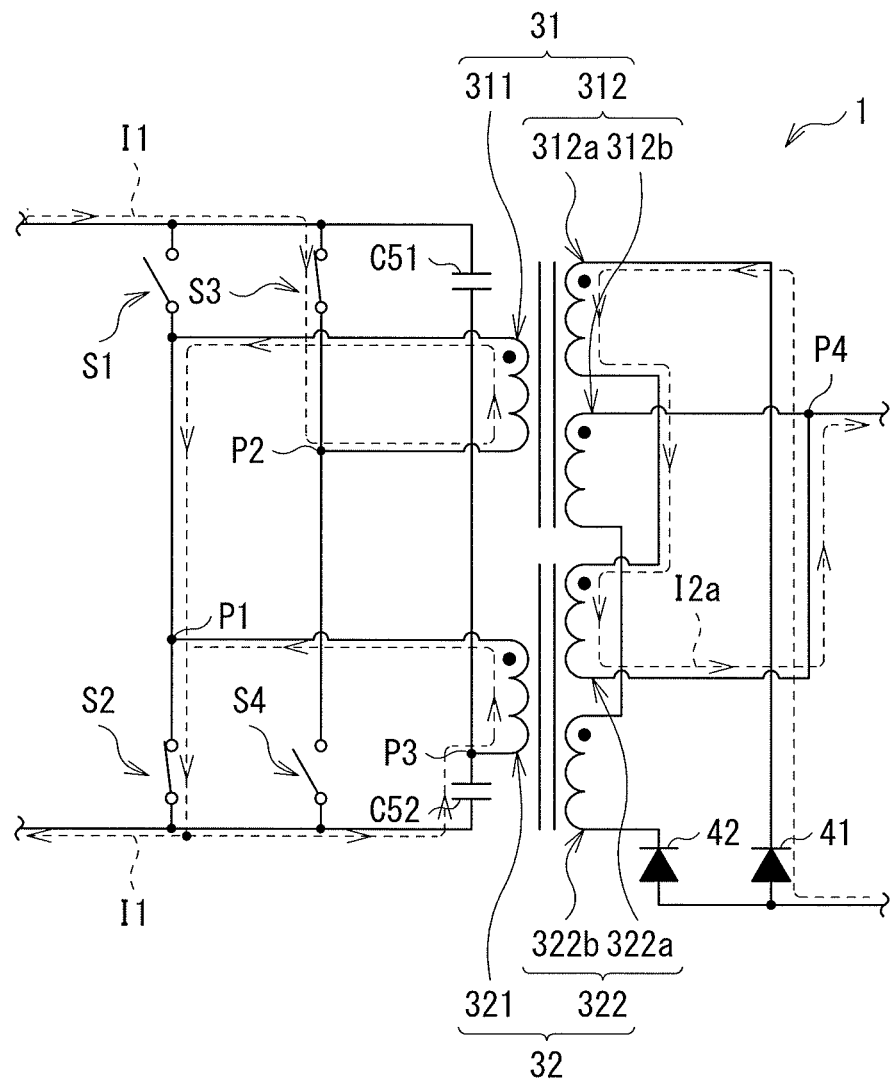
FIG. 7 is a circuit diagram illustrating the example of the operation state, continuously from FIG. 6, of the switching power supply device illustrated in FIG. 1.
Figure 8:
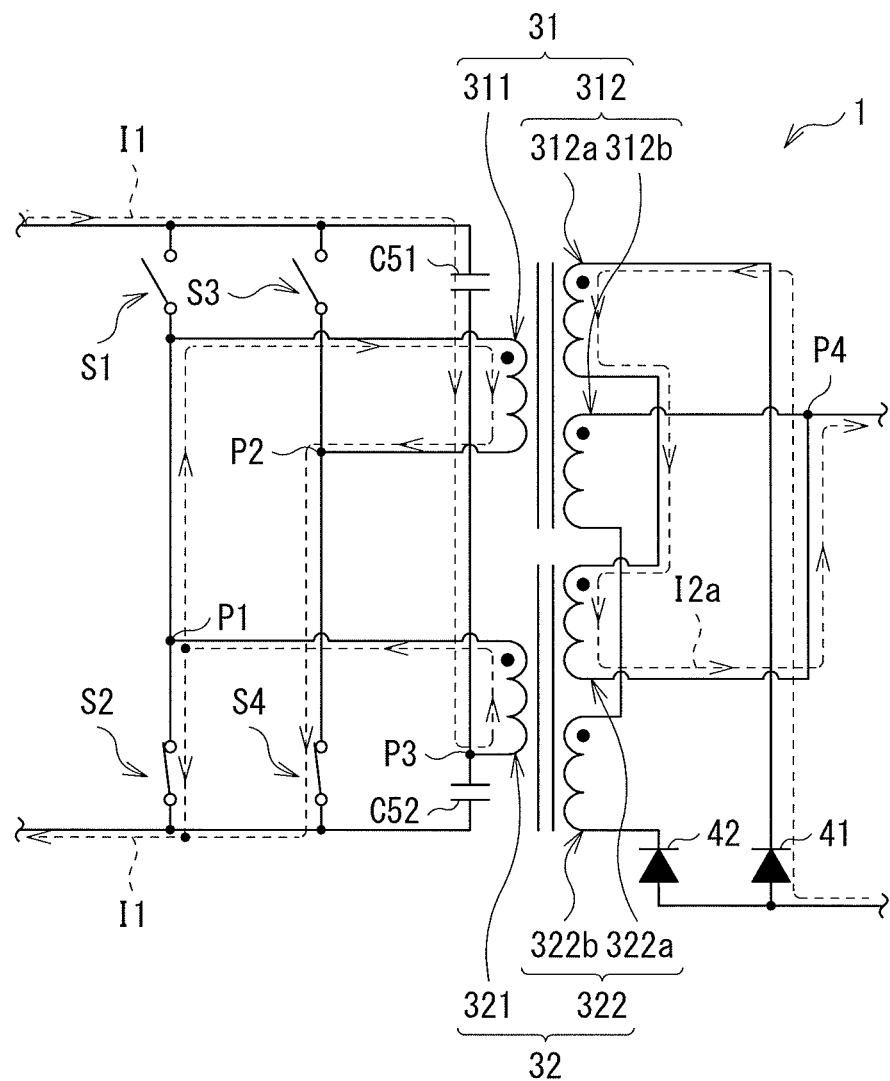
FIG. 8 is a circuit diagram illustrating the example of the operation state, continuously from FIG. 7, of the switching power supply device illustrated in FIG. 1.

FIGS. 5 to 8 are circuit diagrams schematically illustrating states of the switching power supply device 1 within respective periods between timings (from a timing t0 to a timing t4) illustrated in FIG. 4. For example, FIG. 5 illustrates an operation state within a period from the timing t0 to the timing t1. FIG. 6 illustrates another operation state within a period from the timing t1 to the timing t2. FIG. 7 illustrates still another operation state within a period from the timing t2 to the timing t3. FIG. 8 illustrates still another operation state within a period from the timing t3 to the timing t4 (=t0).

The operation example according to the example embodiment illustrated in FIG. 4 may constitute one cycle of the operation example, including the operation example during a period from the timing t0 to the timing t2 (a first half cycle) and the operation example during a period from the timing t2 to the timing t4 (a second half cycle). Likewise, the operation example according to the comparative example 1 illustrated in FIG. 3 constitutes one cycle of the operation example including an operation example during a period from a timing t100 to a timing t102 (a first half cycle) and an operation example during a period from a timing t102 to a timing t104 (=t100) (a second half cycle). The timing t100 to the timing t104 respectively correspond to the timing t0 to the timing t4 (see FIGS. 3 and 4).

B-2. Detailed Operation of Example Embodiment

The drive signals SG1 to SG4 for the respective switching elements S1 to S4 (see Parts (A) and (B) of FIG. 4) will now be described. The switching elements S1 to S4 may be driven, regardless of any state of switching operation, in a combination and at timings where no electrical short-circuit occurs between the input terminals T1 and T2 upon application of the direct current input voltage Vin to the input terminals T1 and T2. In a specific but non-limiting example, the switching elements S3 and S4 may be prevented from coming into the on state simultaneously. Likewise, the switching elements S1 and S2 may be prevented from coming into the on state simultaneously. To avoid such an event that the pairs of the switching elements come into the on state simultaneously, a temporal interval called a "dead time" may be taken. The two inverter circuits 21 and 22 (the switching elements S1 and S2 and the switching elements S3 and S4) may operate with a predetermined phase difference, as illustrated in FIG. 4, for example. That is, the driving circuit 5 may perform the switching phase control on the switching elements S1 to S4, as described above.

Period from Timing t0 to Timing t1

First, during the period from the timing t0 to the timing t1 illustrated in FIG. 5, the switching elements S1 and S4 may both be in the on state, and the switching elements S2 and S3 may both be in the off state, as illustrated in Parts (A) and (B) of FIG. 4. During the corresponding period from the timing t100 to the timing t101 in the comparative example 1, the switching elements S1 and S3 are both in the on state, and the switching elements S2 and S4 are both in the off state, as illustrated in Parts (A) and (B) of FIG. 3.

At this time, in primary sides of the transformers 31 and 32 (i.e., in the inverter circuits 21 and 22), a current I1 may flow as follows: The current I1 may flow into the switching element S1, the primary-side winding 311, and the switching element S4 in this order. The current I1 may further flow into the switching element S1, the primary-side winding 321, and the capacitor C52 in this order.

In secondary sides of the transformers 31 and 32 (i.e., the rectifying and smoothing circuit 4), on the other hand, a current I2b may flow as follows: The current I2b may flow into the rectifying diode 42, the secondary-side windings 322b and 312b, and the choke coil Lch in this order.

Period from Timing t1 to Timing t2

Next, during the period from the timing t1 to the timing t2 illustrated in FIG. 6, the switching elements S1 and S3 may both be in the on state, and the switching elements S2 and S4 may both be in the off state, as illustrated in Parts (A) and (B) of FIG. 4. During the corresponding period from the timing t101 to the timing t102 in the comparative example 1, the switching elements S1 and S4 are both in the on state, and the switching elements S2 and S3 are both in the off state, as illustrated in Parts (A) and (B) of FIG. 3.

At this time, in the primary sides of the transformers 31 and 32, the current I1 may flow as follows: The current I1 may flow into the switching element S3, the primary-side winding 311, the primary-side winding 321, and the capacitor C52 in this order. The current I1 may further flow into the switching element S1, the primary-side winding 321, and the capacitor C52 in this order.

In the secondary sides of the transformers 31 and 32, on the other hand, the current I2b may flow as in the period from the timing t1 to the timing t2 described above. That is, the current I2b may flow into the rectifying diode 42, the secondary-side windings 322b and 312b, and the choke coil Lch in this order.

Period from Timing t2 to Timing t3

Next, during the period from the timing t2 to the timing t3 illustrated in FIG. 7, the switching elements S2 and S3 may both be in the on state, and the switching elements S1 and S4 may both be in the off state, as illustrated in Parts (A) and (B) of FIG. 4. During the corresponding period from the timing t102 to the timing t103 in the comparative example 1, the switching elements S2 and S4 are both in the on state, and the switching elements S1 and S3 are both in the off state, as illustrated in Parts (A) and (B) of FIG. 3.

At this time, in the primary sides of the transformers 31 and 32, the current I1 may flow as follows: The current I1 may flow into the switching element S3, the primary-side winding 311, and the switching element S2 in this order. The current I1 may further flow from the switching element S2 into the primary-side winding 321 in this order.

In the secondary-sides of the transformers 31 and 32, on the other hand, a current I2a may flow as follows: The current I2a may flow into the rectifying diode 41, the secondary-side windings 312a and 322a, and the choke coil Lch in this order.

Period from Timing t3 to Timing t4

Next, during the period from the timing t3 to the timing t4 illustrated in FIG. 8, the switching elements S2 and S4 may both be in the on state, and the switching elements S1 and S3 may both be in the off state, as illustrated in Parts (A) and (B) of FIG. 4. During the corresponding period from the timing t103 to the timing t104 in the comparative example 1, the switching elements S2 and S3 are both in the on state, and the switching elements S1 and S4 are both in the off state, as illustrated in Parts (A) and (B) of FIG. 3.

At this time, in the primary-sides of the transformers 31 and 32, the current I1 may flow as follows: The current I1 may flow into the capacitor C51, the primary-side winding 321, and the switching element S2 in this order. The current I1 may further flow into the primary-side winding 311 and the switching element S4 in this order.

In the secondary sides of the transformers 31 and 32, on the other hand, the current I2a may flow as in the period from the timing t2 to the timing t3 described above. That is, the current I2a may flow into the rectifying diode 41, the secondary-side windings 312a and 322a, and the choke coil Lch in this order.

A series of the operations during the periods from the timing t0 to the timing t4 illustrated in FIGS. 4 to 8 has been described above.

C. Workings and Effects

As described above, the switching power supply device 1 according to the example embodiment may have the circuit configuration illustrated in FIG. 1. Example workings and effects achieved through the operations illustrated in FIGS. 4 to 8 will now be described in comparison with the comparative example 1 illustrated in FIGS. 2 and 3, for example.

C-1. Operations of Comparative Example 1

The switching power supply device 100 according to the comparative example 1 has the circuit configuration illustrated in FIG. 2 and operates as illustrated in FIG. 3. This allows the voltage Vd (i.e., input voltage to be supplied to the smoothing circuit) to be controlled in magnitude so that the voltage Vd is set at several levels. In the comparative example 1, the voltage Vd is set at three stage levels (e.g., the three levels including the voltage V0, a voltage V1, and the voltage V2, as illustrated in Part (E) of FIG. 3), as in the example embodiment described below.

For example, the driving circuit 5 according to the comparative example 1 performs the switching driving to cause the two inverter circuits 101 and 22 to operate with a predetermined phase difference while operating. While the switching driving, the driving circuit 5 switches the coupling state between the secondary-side windings 312 and 322 included in the respective transformers 31 and 32 at a predetermined time ratio. The direct current output voltage Vout is thus controlled in magnitude.

With reference to schematic diagrams illustrated in FIGS. 9A to 9C, a detailed description will be given herein of how the direct current output voltage Vout is controlled through the switching in coupling state in the comparative example 1.

The driving circuit 5 according to the comparative example 1 performs the switching driving for the inverter circuits 101 and 22 so that a coupling state between the secondary-side windings 312 and 322 is switched between a two-parallel coupling state illustrated in FIG. 9B and a two-series coupling state illustrated in FIG. 9C. In other words, the coupling state is switched between the two-parallel coupling state and the two-series coupling state in accordance with the switching of the transformers 31 and 32 between the state of having an identical output phase and the state of having opposite output phases.

In the two-parallel coupling state illustrated in FIG. 9B, currents I2p1 and I2p2 flow in parallel to each other in the respective secondary-side windings 312 and 322 in combinations of directions illustrated with solid lines and dashed lines. For example, with reference to the configuration of the rectifying and smoothing circuit 104 illustrated in FIG. 9A, the current I2p1 illustrated with the solid line flows into the rectifying diode 412, the secondary-side winding 312, and the rectifying diode 421 in this order. The current I2p1 illustrated with the dashed line flows into the rectifying diode 422, the secondary-side winding 312, and the rectifying diode 411 in this order. Likewise, the current I2p2 illustrated with the solid line flows into the rectifying diode 432, the secondary-side winding 322, and the rectifying diode 421 in this order. The current I2p2 illustrated with the dashed line flows into the rectifying diode 422, the secondary-side winding 322, and the rectifying diode 431 in this order.

In the two-series coupling state illustrated in FIG. 9C, on the other hand, a current I2s flows in series in the secondary-side windings 312 and 322 in a combination of directions illustrated with a solid line and a dashed line. For example, with reference to the configuration of the rectifying and smoothing circuit 104 illustrated in FIG. 9A, the current I2s illustrated with the solid line flows into the rectifying diode 412, the secondary-side winding 312, the secondary-side winding 322, and the rectifying diode 431 in this order. The current I2s illustrated with the dashed line flows into the rectifying diode 432, the secondary-side winding 322, the secondary-side winding 312, and the rectifying diode 411 in this order.

As described above, in the switching power supply device 100 according to the comparative example 1, the secondary-side windings 312 and 322 included in the respective transformers 31 and 32 are switched in coupling state. The voltage Vd is thereby controlled in magnitude and set at several (e.g., three) levels.

C-2. Workings and Effects of Example Embodiment

In contrast to the comparative example 1, the inverter circuit 2 in the switching power supply device 1 according to the example embodiment may include the inverter circuit 21 and the inverter circuit 22. The inverter circuit 21 may be a full-bridge circuit having the circuit configuration described above. The inverter circuit 22 may be a half-bridge circuit having the circuit configuration described above. The driving circuit 5 according to the example embodiment may perform the switching driving for the switching elements S1 to S4 to cause the inverter circuit 2 (21 and 22) to apply a voltage described below to each of the primary-side windings 311 and 321 of the respective transformers 31 and 32.

In a specific but non-limiting example, the primary-side winding 311 of the transformer 31 may receive a predetermined pulse voltage (pulse voltage Va illustrated in Part (C) of FIG. 4) from the inverter circuit 2. The primary-side winding 321 of the transformer 32 may receive a predetermined voltage value (voltage value of the voltage Vb illustrated in Part (D) of FIG. 4) from the inverter circuit 2.

With the circuit configuration and the operations (the switching driving) described above, it is possible to achieve multiple-level output in which the voltage Vd is set at multiple successive stage levels, in the switching power supply device 1 according to the example embodiment. In a specific but non-limiting example, the voltage Vd may be set at three successive stage levels including a zero level (i.e., the voltage V0 illustrated in Part (E) of FIG. 4), a first level (i.e., the voltage V1 illustrated in Part (E) of FIG. 4), and a second level (i.e., the voltage V2 illustrated in Part (E) of FIG. 4) in the example embodiment.

In the switching power supply device 100 according to the comparative example 1 illustrated in FIGS. 2, 3, and 9A to 9C, the rectifying and smoothing circuit 104 includes the three arms and the six rectifying diodes 411, 412, 421, 422, 431, and 432, as described above, to set the voltage Vd at the three stage levels. That is, given that the number of inverter circuits and the number of transformers are each generalized to N (where N is an integer of 2 or greater), an [(N+1)*2] number of rectifying diodes should be included. In the rectifying and smoothing circuit 104 according to comparative example 1, the six rectifying diodes are included as described above. The switching power supply device 100 according to the comparative example 1 thus can raise concerns about an increase in cost for components or an increase in the device size, which can hinder setting of the voltage Vd (i.e., input voltage to be supplied to the smoothing circuit) at several levels.

In contrast, in the switching power supply device 1 according to the example embodiment, the driving circuit 5 may perform the switching driving as described below to set the voltage Vd at the three successive stage levels. That is, the switching driving may be performed to cause the inverter circuit 2 (21 and 22) to apply a predetermined pulse voltage or a voltage at a predetermined voltage value to each of the primary-side windings 311 and 321 in the respective transformers 31 and 32. Unlike the switching power supply device 100 (the rectifying and smoothing circuit 104) described above, the switching power supply device 1 may include an ordinary center-tap rectifying and smoothing circuit as the rectifying and smoothing circuit 4, as described above. Therefore, only the two rectifying diodes 41 and 42 may be required. That is, the rectifying diodes included in the rectifying and smoothing circuit 4 may be decreased in number (from six to two) in the first example embodiment, compared with the comparative example 1 described above. This leads to a reduction in cost for components and a reduction in the device size.

In the first example embodiment described above, the switching power supply device 1 may have the circuit configuration illustrated in FIG. 1 and operate as illustrated in FIGS. 4 to 8. This leads to a reduction in cost for components and a reduction in size of the device that generates the voltage Vd (i.e., input voltage to be supplied to the smoothing circuit) at multiple levels, compared with the comparative example 1, for example. It therefore is possible to generate the voltage Vd at multiple levels more easily in the example embodiment than in the comparative example 1, for example.

In the example embodiment, the rectifying diode 41 may be disposed between the secondary-side winding 312 and the ground, and the rectifying diode 42 may be further disposed between the secondary-side winding 322 and the ground. In other words, low-side disposition is made as illustrated in FIG. 1. This may provide effects described below, for example. That is, with the low-side disposition of all the rectifying diodes 41 and 42 in the rectifying and smoothing circuit 4, it is possible to achieve a circuit configuration that is advantageous for synchronous rectification, compared with a case where no such low-side disposition is applied (a case where a high-side disposition is applied), for example. It therefore is possible to more easily achieve the switching power supply device 1 with low voltage and large current features in the example embodiment than in a case where a high-side disposition is applied, for example.

3. Second Example Embodiment

Next, a description will be given herein of a second example embodiment of the disclosure. It is to be noted that like reference numerals designate, through the drawings, substantially identical or corresponding components in the first example embodiment. Some redundant descriptions will thus be appropriately omitted.

Configuration

Figure 10:
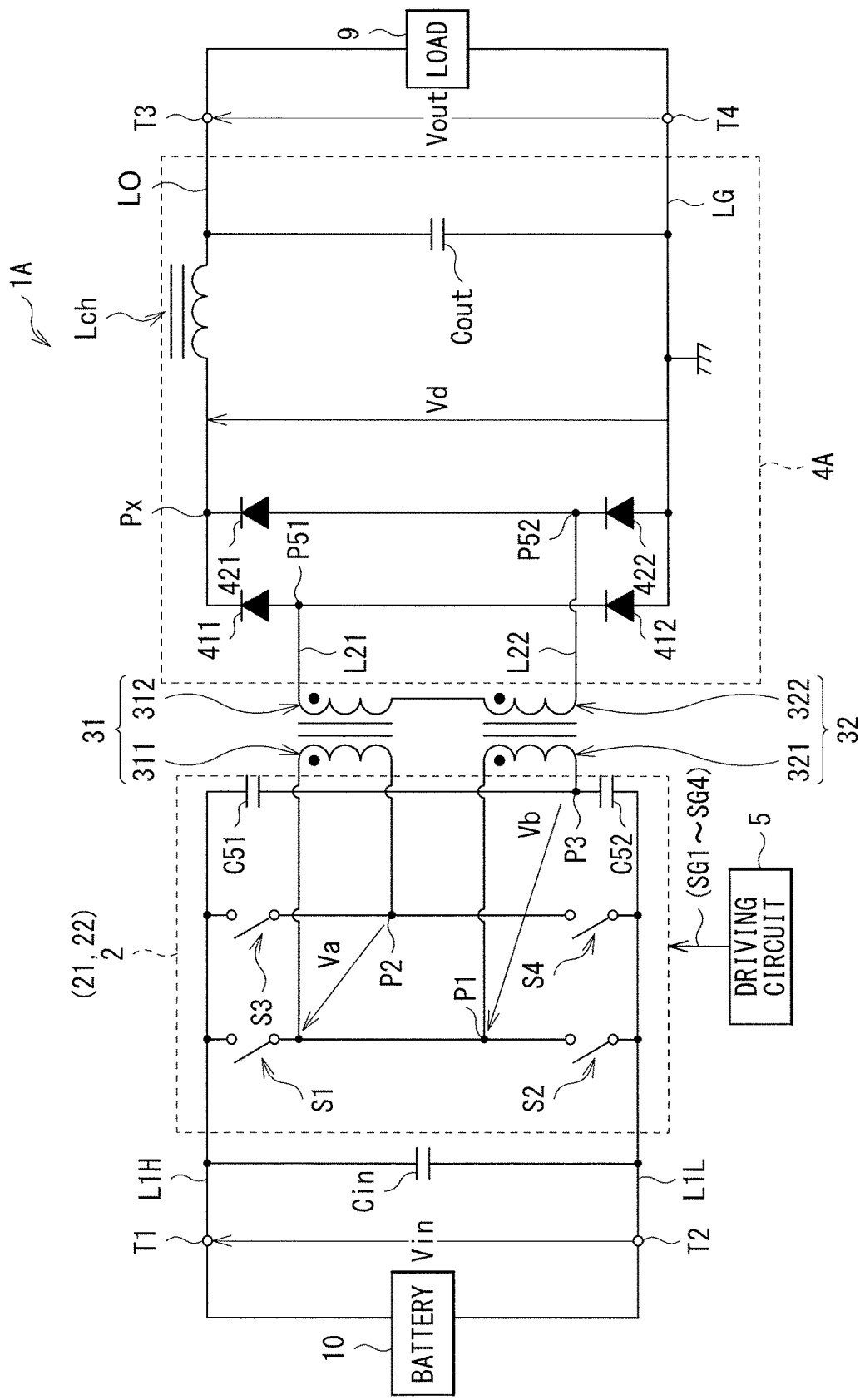
FIG. 10 is a circuit diagram illustrating an outline configuration example of a switching power supply device according to one example embodiment.

FIG. 10 is a circuit diagram illustrating an outline configuration example of a switching power supply device 1A according to the second example embodiment.

The switching power supply device 1A according to the second example embodiment may be different from the switching power supply device 1 according to the first example embodiment illustrated in FIG. 1 in being provided with a rectifying and smoothing circuit 4A instead of the rectifying and smoothing circuit 4. Other components in the switching power supply device 1A may be substantially the same as those in the switching power supply device 1.

Rectifying and Smoothing Circuit 4A

The rectifying and smoothing circuit 4A may be provided with four rectifying diodes 411, 412, 421, and 422, instead of the two rectifying diodes 41 and 42 in the rectifying and smoothing circuit 4 illustrated in FIG. 1. Unlike the "center-tap" rectifying and smoothing circuit 4 described above, the rectifying and smoothing circuit 4A may be a "full-bridge" rectifying and smoothing circuit. The choke coil Lch and the output smoothing capacitor Cout in the rectifying and smoothing circuit 4A may be respectively identical in disposition position to the choke coil Lch and the output smoothing capacitor Cout in the rectifying and smoothing circuit 4. Some redundant descriptions will thus be appropriately omitted.

In one example embodiment of the disclosure, the rectifying diodes 411, 412, 421, and 422 may correspond to specific but non-limiting examples of "rectifying elements".

In the rectifying and smoothing circuit 4A, anodes of the rectifying diodes 412 and 422 may be grounded. Cathodes of the rectifying diodes 411 and 421 may be coupled to the node Px on the output line LO. An anode of the rectifying diode 411 and a cathode of the rectifying diode 412 may be coupled to a node P51. An anode of the rectifying diode 421 and a cathode of the rectifying diode 422 may be coupled to a node P52.

The secondary-side winding 312 may have a first end coupled to a first end of the secondary-side winding 322, and a second end coupled to the node P51 via a secondary-side line L21. The secondary-side winding 322 may have a second end coupled to the node P52 via a secondary-side line L22. That is, the secondary-side windings 312 and 322 may be coupled in series to each other between the nodes P51 and P52.

Operations, Workings, and Effects

The switching power supply device 1A according to the second example embodiment may voltage-convert the direct current input voltage Vin to generate the direct current output voltage Vout, basically as in the switching power supply device 1 according to the first example embodiment.

Additionally, with the switching power supply device 1A, it is possible to achieve the multiple-level output in which the voltage Vd is set at multiple successive stage levels, as with the switching power supply device 1. In a specific but non-limiting example, the voltage Vd may be set at the three successive stage levels including the zero level (i.e., the voltage V0), the first level (i.e., the voltage V1), and the second level (i.e., the voltage V2) as in the first example embodiment.

Furthermore, in the switching power supply device 1A, the driving circuit 5 may perform the switching driving as described below to set the voltage Vd at the three successive stage levels, as in the switching power supply device 1. That is, the switching driving may be performed to cause the inverter circuit 2 (21 and 22) to apply a predetermined pulse voltage (pulse voltage Va) or a voltage at a predetermined voltage value (voltage value of the voltage Vb) to each of the primary-side windings 311 and 321 in the respective transformers 31 and 32.

In the switching power supply device 1A, the rectifying and smoothing circuit 4A may be the ordinary full-bridge rectifying and smoothing circuit, as described above. Therefore, only the four rectifying diodes 411, 412, 421, and 422 may be required. That is, the number of the rectifying diodes included in the rectifying and smoothing circuit 4A in the second example embodiment is decreased (from six to four), compared with the comparative example 1 described above. This leads to a reduction in cost for components and a reduction in the device size.

Even in the second example embodiment described above, it is possible to achieve a reduction in cost for components and a reduction in size of the device that generates the voltage Vd (i.e., input voltage to be supplied to the smoothing circuit) at multiple levels, compared with the comparative example 1, for example. It therefore is possible to generate the voltage Vd at multiple levels more easily in the second example embodiment than in the comparative example 1, for example.

3. Modification Example 1

Next, a description will be given herein of a modification example 1 of the second example embodiment described above. It is to be noted that like reference numerals designate, through the drawings, substantially identical or corresponding components in the first and second example embodiments. Some redundant descriptions will thus be appropriately omitted.

Configuration

Figure 11:
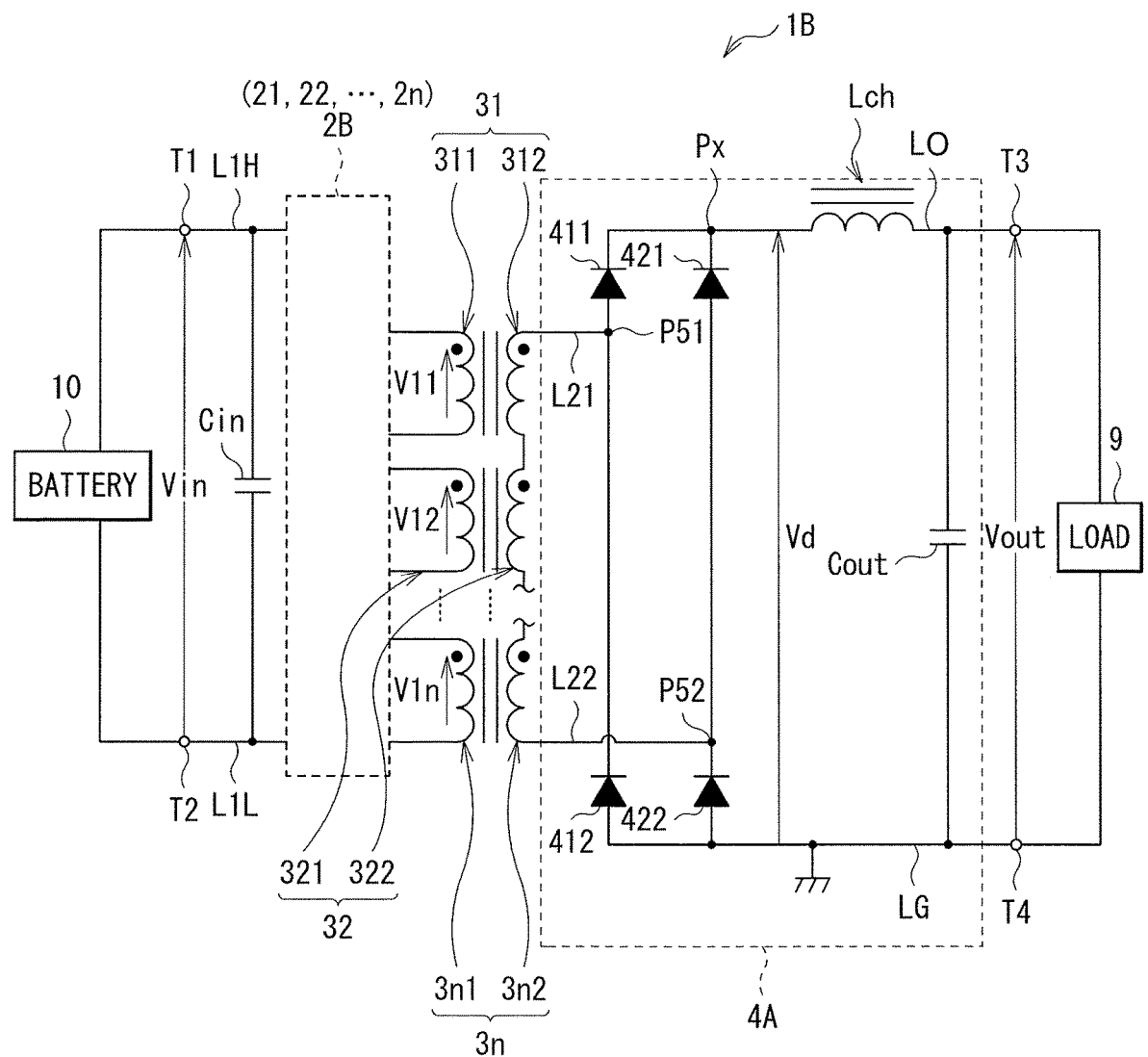
FIG. 11 is a circuit diagram illustrating an outline configuration example of a switching power supply device according to a modification example.

FIG. 11 is a circuit diagram illustrating an outline configuration example of a switching power supply device 1B according to the modification example 1. The switching power supply device 1B according to the modification example 1 may be different from the switching power supply device 1A according to the second example embodiment in that the number of inverter circuits and the number of transformers are each generalized to N (where N is an integer of 2 or greater) as described below. Other components may be substantially the same as those in the switching power supply device 1A. That is, the full-bridge rectifying and smoothing circuit 4A described in the second example embodiment may be used in not only the second example embodiment where N is 2 but also the modification example 1 where N is any number of 3 or greater. In other words, in the rectifying and smoothing circuit 4A, the number of rectifying diodes may be always four (the rectifying diodes 411, 412, 421, and 422), regardless of the value of N (numbers of inverter circuits and transformers).

In a specific but non-limiting example, the switching power supply device 1B according to the modification example 1 may be different from the switching power supply device 1A according to the second example embodiment illustrated in FIG. 10 in being provided with an inverter circuit 2B (21, 22, . . . , 2n) and N number of transformers (transformers 31 and 32, . . . 3n) instead of the inverter circuit 2 (21 and 22) and the two transformers 31 and 32. Other components in the switching power supply device 1B may be substantially the same as those in the switching power supply device 1A. The letter "n" for the inverter circuit 2n and the transformer 3n may correspond to the value of N described above and represent any integer of 2 or greater.

In the inverter circuit 2B, the inverter circuit 21 may be the full-bridge circuit, and the inverter circuits 22 to 2n may each be the half-bridge circuits.

In the N number of transformers 31, 32, . . . , 3n described above, primary-side windings 311, 321, . . . , 3n1 may be respectively coupled to the N number of inverter circuits 21, 22, . . . , 2n, as in the second example embodiment. Secondary-side windings 312, 322, . . . , 3n2 may be respectively coupled in series to each other between the nodes P51 and P52 in the rectifying and smoothing circuit 4A, as in the second example embodiment.

Operations, Workings, and Effects

The switching power supply device 1B according to the modification example 1 may voltage-convert the direct current input voltage Vin to generate the direct current output voltage Vout, basically as in the switching power supply devices 1 and 1A according to the first and second example embodiments. Additionally, with the switching power supply device 1B, it is possible to achieve the multiple-level output in which the voltage Vd is set at multiple successive stage levels, as with the switching power supply devices 1 and 1A.

Figure 12:
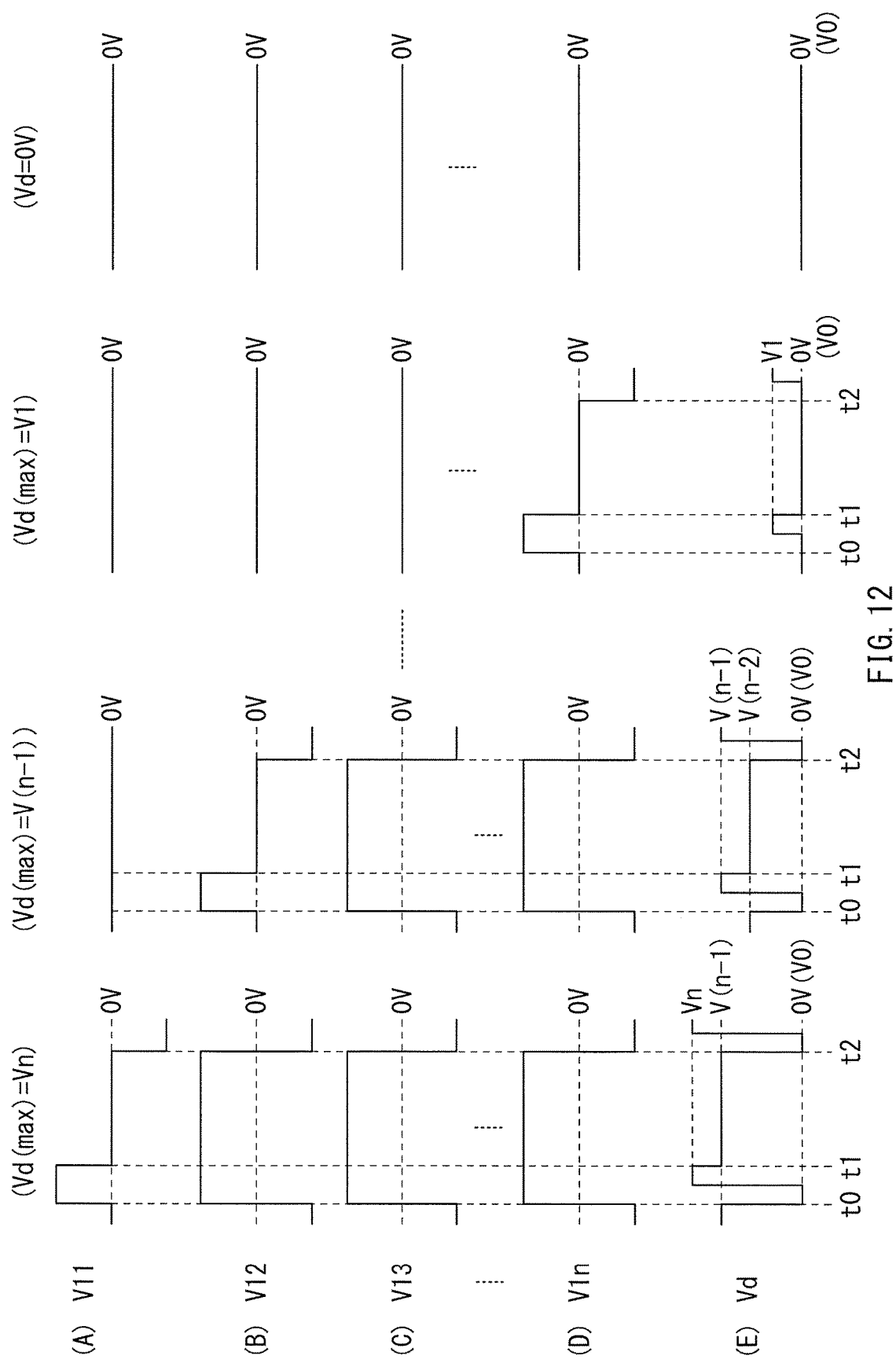
FIG. 12 is a timing waveform diagram illustrating how an input voltage to be supplied to a smoothing circuit is set at multiple levels in the modification example.

FIG. 12 is a timing waveform diagram illustrating how the voltage Vd (i.e., supplied to the smoothing circuit) is set at multiple levels in the modification example 1. FIG. 12 illustrates examples of the voltage waveforms in a case where the switching phase control, out of the switching phase control and the PMW control described above, is performed.

In FIG. 12, Parts (A) to (D) illustrate voltage waveforms of respective alternating current voltages (voltages V11, V12, V13, . . . , V1n) to be applied to the respective primary-side windings 311, 321, 331, . . . , 3n1 described above. In FIG. 12, Part (E) illustrates the voltage Vd (see FIG. 11) at a point (i.e., the node Px) in front of the choke coil Lch. In FIG. 12, a lateral axis represents the time t. As for a direction of voltage, a direction illustrated with an arrow in FIG. 11 is specified as a normal direction.

In the modification example 1, the voltage Vd may be set as described below (see Part (E) of FIG. 12), for example, upon the multiple-level output. That is, the voltage Vd may be set at multiple successive stage levels (N+1) including the zero level (i.e., the voltages V0) and the first level (i.e., the voltage V1) to an (n−1) level (i.e., the voltage V(n−1)), and an n level (i.e., the voltage Vn).

At this time, the driving circuit 5 according to the modification example 1 may perform the switching driving to apply a predetermined pulse voltage to the primary-side winding (a first primary-side winding) of one transformer among the N number of transformers 31 to 3n and apply a voltage at a predetermined voltage value to the primary-side windings (second primary-side windings) of the other transformers than the one transformer.

In a specific but non-limiting example, as for the leftmost case in FIG. 12 where Vd(max)=Vn is satisfied, a predetermined pulse voltage illustrated as the voltage V11 may be applied to the primary-side winding 311 of the transformer 31. On the other hand, voltages at other predetermined voltage values illustrated as the voltages V12 to V1n (in this example, voltages at voltage values which indicate the H state and correspond to the direct current input voltage Vin) may be applied to the respective primary-side windings 311 to 3n1 of the other transformers (i.e., the transformers 32 to 3n). In this case, as illustrated in Part (E) of FIG. 12, the voltage Vd may correspond to the voltage Vn or V(n−1), or 0 V.

As for the second leftmost case in FIG. 12 where Vd(max)=V(n−1) is satisfied, the predetermined pulse voltage illustrated as the voltage V12 may be applied to the primary-side winding 321 of the transformer 32. On the other hand, voltages at the other predetermined voltage values illustrated as the voltages V11, V13 to V1n may be applied to the respective primary-side windings 311, 331 to 3n1 of the other transformers (i.e., the transformers 31, 33 to 3n). For example, a voltage value corresponding to 0 V may be applied to the primary-side winding 311, and voltages at voltage values which indicate the H state and correspond to the direct current input voltage Vin may be applied to the respective primary-side windings 331 to 3n1. In this case, as illustrated in Part (E) of FIG. 12, the voltage Vd may correspond to the voltage V(n−1) or V(n−2), or 0 V.

Furthermore, as for the third leftmost case in FIG. 12 where Vd(max)=V1 is satisfied, the predetermined pulse voltage illustrated as the voltage V1n may be applied to the primary-side winding 3n1 of the transformer 3n. On the other hand, voltages at the other predetermined voltage values illustrated as the voltage V11 to V1(n−1) may be applied to the respective primary-side windings 311 to 3(n−1)1 of the other transformers (the transformers 31 to 3(n−1)). For example, a voltage value corresponding to 0 V may be applied to each of the primary-side windings 311 to 3(n−1)1. In this case, as illustrated in Part (E) of FIG. 12, the voltage Vd may correspond to the voltage V1 or the voltage V0 (=0 V).

As for the fourth leftmost case in FIG. 12 where Vd=0 V is satisfied, voltages at the predetermined voltage values illustrated as the voltages V11 to V1n (in this example, a voltage value corresponding to 0 V) may be applied to the respective primary-side windings 311 to 3n1 of the transformers 31 to 3n. In this case, as illustrated in Part (E) of FIG. 12, the voltage Vd may always correspond to the voltage V0 (may always have a value of 0 V).

In the modification example 1, as described above, the level of the voltage Vd (i.e., input voltage to be supplied to the smoothing circuit) may gradually decrease as the number of the second primary-side windings to which a voltage at a predetermined voltage value of 0 V is applied increases. In a specific but non-limiting example, as for the first to fourth leftmost cases in FIG. 12, the level (a maximum value or an upper limit value) of the voltage Vd may gradually decrease from Vn to V(n−1), V1, and V0 as the number of the second primary-side windings increases from 0 to 1, . . . , (N−1), and N.

As described above, the number of the rectifying diodes included in the rectifying and smoothing circuit 4A in the modification example 1 is decreased (from six to four), compared with the comparative example 1 described above. This leads to the following results. That is, it is possible to achieve a reduction in cost for components and a reduction in sizes of the device that generates the voltage Vd (i.e., supplied to the smoothing circuit) at multiple levels, compared with the comparative example 1, for example. It therefore is possible to generate the voltage Vd at multiple levels more easily in the modification example 1 than in the comparative example 1, for example.

In the modification example 1, as described above, the number of rectifying diodes in the rectifying and smoothing circuit 4A is always four (the rectifying diodes 411, 412, 421, and 422), regardless of the value of N (numbers of inverter circuits and transformers). This leads to the following results. That is, even in a case where the value of N (the numbers of inverter circuits and transformers) is increased, i.e., the number of levels is increased for the voltage Vd (i.e., input voltage to be supplied to the smoothing circuit) in the switching power supply device 1B, the number of rectifying diodes does not increase (may be always four). Therefore, even in such a case as described above, it is still possible to easily generate voltage Vd at multiple levels.

Furthermore, in the modification example 1, the level of the voltage Vd (i.e., supplied to the smoothing circuit) may gradually decrease as the number of the second primary-side windings to which a voltage at a predetermined voltage value of 0 V is applied increases. This leads to the following results. That is, even in a case where the value of N (the numbers of inverter circuits and transformers) is increased, it is possible to set the voltage Vd in a seamless manner (at multiple successive stage levels (N+1)), unlike the comparative example 1 described above, for example.

4. Other Modification Examples

Although the technology has been described above with reference to the example embodiments and the modification examples, the technology is not limited to the example embodiments and the modification examples. It is possible to modify the technology in a wide variety of ways.

For example, the example embodiments and the modification examples have been described above with reference to the configurations of the inverter circuits as specific but non-limiting examples. However, the technology is not limited to the example embodiments and the modification examples described above. Other configurations may be used as inverter circuits. In a specific but non-limiting example, the example embodiments and the modification examples have been described above with mainly reference to the cases where the inverter circuits are half-bridge circuits each including two switching elements or are full-bridge circuits each including four switching elements. However, the technology is not limited to the cases described above. Inverter circuits each having another configuration may be used.

In the example embodiments and the modification examples described above, the configurations of the rectifying and smoothing circuits (the center-tap or full-bridge circuit configurations) have been described as specific but non-limiting examples. However, the technology is not limited to the example embodiments and the modification examples described above. Other configurations may be used as rectifying and smoothing circuits. In a specific but non-limiting example, for example, parasitic diodes of MOS-FETs may be used to configure rectifying elements in a rectifying and smoothing circuit. In this case, each of the MOS-FETs be in the on state (to perform synchronous rectification) in synchronization with a period during which each of the parasitic diodes of the MOS-FETs is in a conduction state. One reason for this is that it is possible to perform rectification with a lesser voltage drop. In this case, a source side of each of the MOS-FETs may be disposed with an anode side of each of the parasitic diodes. A drain side of each of the MOS-FETs may be disposed with a cathode side of each of the parasitic diodes.

Furthermore, the example embodiments and the modification examples have been described above with mainly reference to the examples where the numbers of inverter circuits and transformers are each two (the cases where the number of rectifying elements in a rectifying and smoothing circuit is two or four). However, such numbers are not limited to the numbers in the cases of the example embodiments and the modification examples. In a specific but non-limiting example, as described in the modification example 1, for example, it is possible to apply the technology to a case where the numbers of inverter circuits and transformers are each N number (N: an integer of 2 or greater). That is, it is possible to similarly apply the technology to not only the case where N is 2 as described above in the example embodiments, for example, but also a case where N is any number of 3 or greater. The numbers of inverter circuits, transformers, and rectifying elements, as described above in the example embodiments and the modification examples, mean not only numbers of physical inverter circuits, transformers, and rectifying elements, but also numbers of inverter circuits, transformers, and rectifying elements represented in an equivalent circuit.

In addition, the example embodiments and the modification examples have been described above with reference to the method of allowing the driving circuit to control operations of the switching elements (to perform the switching driving), as a specific but non-limiting example. However, the technology is not limited to the example embodiments and the modification examples described above. As a method of such switching driving, another method may be used. In a specific but non-limiting example, for example, the methods of the switching phase control and the PMW control described above, the method of applying a predetermined pulse voltage or a voltage at a voltage value described above, the method of setting the voltage Vd at multiple levels described above, and other methods are not limited to the methods described above in the example embodiments and the modification examples. Other methods may be used. The number of levels (the number of stages) at which the voltage Vd is set is not limited to the example of the number of levels (three levels) mainly described above in the example embodiments and the modification examples. As described in the modification example 1, for example, the number of levels (the number of stages) may be set to any number of four or greater.

The example embodiments and the modification examples have been each described above with reference to the DC-DC converter as one example of the switching power supply devices according to the technology. However, it is possible to apply the technology to other kinds of switching power supply devices such as alternating current (AC)-direct current (DC) converters.

Furthermore, for example, the configuration examples described so far may be combined and applied in a desired manner.

It is possible to achieve at least the following configurations from the foregoing embodiments and modification examples of the disclosure.

(1) A switching power supply device including:
  a pair of input terminals configured to receive an input voltage;
  a pair of output terminals configured to output an output voltage;
  N number of transformers including respective primary-side windings and respective secondary-side windings, the N being an integer of 2 or greater;
  N number of inverter circuits disposed in parallel to each other between the pair of input terminals and the primary-side windings, the N number of inverter circuits each including switching elements;
  a rectifying and smoothing circuit disposed between the pair of output terminals and the secondary-side windings, the rectifying and smoothing circuit including a rectifying circuit including a plurality of rectifying elements and a smoothing circuit including a capacitor disposed between a choke coil and the pair of output terminals; and
  a driver configured to
    perform switching driving that controls operations of the respective switching elements in the N number of inverter circuits, and
    set an input voltage to be supplied to the smoothing circuit at successive stage levels (N+1) from a 0 level to an N level by causing, through the switching driving, the N number of inverter circuits to apply a predetermined pulse voltage or a voltage at a predetermined voltage value to the respective primary-side windings of the N number of transformers.

(2) The switching power supply device according to (1), wherein the driver configured to perform the switching driving to cause, when setting the input voltage to be supplied to the smoothing circuit at the successive stage levels (N+1), the predetermined pulse voltage to be applied to a first primary-side winding, and cause the voltage at the predetermined voltage value to be applied to a second primary-side winding, the first primary-side winding being the primary-side winding of one of the N number of transformers, the second primary-side winding being the primary-side winding of another one of the N number of transformers.

(3) The switching power supply device according to (2), wherein a level of the input voltage to be supplied to the smoothing circuit is configured to be set to gradually decrease as the second primary-side winding to be applied with the voltage at the predetermined voltage value increases in number, the predetermined voltage value being a voltage of 0 (zero) volts.

(4) The switching power supply device according to any one of (1) to (3), wherein the rectifying and smoothing circuit being a center-tap rectifying and smoothing circuit.

(5) The switching power supply device according to (4), wherein
the N is 2, and
the rectifying elements include two rectifying elements.

(6) The switching power supply device according to any one of (1) to (3), wherein the rectifying and smoothing circuit includes a full-bridge rectifying and smoothing circuit.

(7) The switching power supply device according to (6), wherein the rectifying elements include four rectifying elements regardless of a value of the N.

With the switching power supply device according to any of the example embodiment of the disclosure, it is possible to easily generate an input voltage at multiple levels to be supplied to the smoothing circuit.

Moreover, the disclosure encompasses any possible combination of some or all of the various embodiments and the modification examples described herein and incorporated herein. Although the disclosure has been described in terms of exemplary embodiments, it is not limited thereto. It should be appreciated that variations may be made in the described embodiments by persons skilled in the art without departing from the scope of the disclosure as defined by the following claims. The limitations in the claims are to be interpreted broadly based on the language employed in the claims and not limited to examples described in this specification or during the prosecution of the application, and the examples are to be construed as non-exclusive. For example, the use of the terms first, second, etc. do not denote any order or importance, but rather the terms first, second, etc. are used to distinguish one element from another. The term "substantially" and its variations are defined as being largely but not necessarily wholly what is specified as understood by one of ordinary skill in the art. The term "about" as used herein can allow for a degree of variability in a value or range. The term "disposed above/provided above/formed above" and its variants as used herein refer to elements disposed directly in contact with each other or indirectly by having intervening structures therebetween. The term "disposed on/provided on/formed on" and its variants as used herein refer to elements disposed directly in contact with each other or indirectly by having intervening structures therebetween. Moreover, no element or component in this disclosure is intended to be dedicated to the public regardless of whether the element or component is explicitly recited in the following claims.

What is claimed is:

1. A switching power supply device comprising:
a pair of input terminals configured to receive an input voltage;
a pair of output terminals configured to output an output voltage;
N number of transformers including respective primary-side windings and respective secondary-side windings, the N being an integer of 2 or greater;
N number of inverter circuits disposed in parallel to each other between the pair of input terminals and the primary-side windings, the N number of inverter circuits each including switching elements;
a rectifying and smoothing circuit disposed between the pair of output terminals and the secondary-side windings, the rectifying and smoothing circuit including:
a rectifying circuit having either (i) only two rectifying elements or (ii) only four rectifying elements, and
a smoothing circuit including a capacitor disposed between a choke coil and the pair of output terminals; and
a driver configured to
perform switching driving that controls operations of respective switching elements in the N number of inverter circuits, and
set an input voltage to be supplied to the smoothing circuit at multiple stage levels from a 0 level to an N level by causing, through the switching driving, the N number of inverter circuits to apply a predetermined pulse voltage or a voltage at a predetermined voltage value to the respective primary-side windings of the N number of transformers.

2. The switching power supply device according to claim 1, wherein the driver is configured to perform the switching driving to cause, when setting the input voltage to be supplied to the smoothing circuit at the multiple stage levels, the predetermined pulse voltage to be applied to a first primary-side winding, and cause the voltage at the predetermined voltage value to be applied to a second primary-side winding, the first primary-side winding comprising the primary-side winding of one of the N number of transformers, the second primary-side winding comprising the primary-side winding of another one of the N number of transformers.

3. The switching power supply device according to claim 2, wherein a level of the input voltage supplied to the smoothing circuit decreases, as a number of the second primary-side windings applied with the voltage at the predetermined voltage value increases, the predetermined voltage value being a voltage of 0 (zero) volts.

4. The switching power supply device according to claim 1, wherein
the rectifying and smoothing circuit comprises a center-tap rectifying and smoothing circuit.

5. The switching power supply device according to claim 1, wherein the rectifying and smoothing circuit comprises a full-bridge rectifying and smoothing circuit.

* * * * *